United States Patent [19]

Suzuki

[11] Patent Number: 5,296,838
[45] Date of Patent: Mar. 22, 1994

[54] WIRELESS INPUT SYSTEM FOR COMPUTER

[75] Inventor: Toru Suzuki, Kanagawa, Japan

[73] Assignee: Digital Stream Corp., Sagamihara, Japan

[21] Appl. No.: 870,955

[22] Filed: Apr. 20, 1992

[30] Foreign Application Priority Data

Apr. 22, 1991 [JP] Japan .................................. 3-118118

[51] Int. Cl.⁵ ........................... G09G 3/02; G01V 9/04
[52] U.S. Cl. .................................. 345/157; 250/201.8; 250/221; 345/179
[58] Field of Search ............ 250/201.02, 201.8, 227.13, 250/221; 340/706, 710, 709, 707; 235/472; 382/59; 359/696

[56] References Cited

U.S. PATENT DOCUMENTS

| 4,123,765 | 10/1978 | Isono | 250/201.8 |
| 4,562,346 | 12/1985 | Hayashi et al. | 250/201.8 |
| 4,626,077 | 12/1986 | Yamamoto | 359/696 |
| 4,688,933 | 8/1987 | Lapeyre | 340/710 |
| 5,045,843 | 9/1991 | Hansen | 340/707 |
| 5,166,668 | 11/1992 | Aoyagi | 340/710 |

FOREIGN PATENT DOCUMENTS 25924 1/1992 Japan .

Primary Examiner—Alvin E. Oberley
Assistant Examiner—Kara A. Fernandez
Attorney, Agent, or Firm—Ostrager, Chong & Flaherty

[57] ABSTRACT

A cylindrical frame is provided with an incident angle detecting section for detecting an incident angle of the light from a source of light capable of transmitting pulses and a focus detecting section having a movable lens constructed so that it detects an incident light from the source of light to control the focus position of the incident light. On the basis of the incident angle detected by the incident angle detecting section, the movable lens is caused to be directed to the source of light. Furthermore, by the focus detecting section, the focus position of light is controlled to detect the position of the movable lens. A distance from the position to the source of light is calculated.

13 Claims, 5 Drawing Sheets

WIRELESS INPUT SYSTEM FOR COMPUTER

BACKGROUND OF THE INVENTION

This invention relates to a wireless input system for a computer. More particularly it relates to improvements in the earlier invention described in the U.S. patent application Ser. No. 07/831,944 filed on Feb. 6, 1992, issued as U.S. Pat. No. 5,227,622 on Jul. 13, 1993 which was assigned to the same applicant.

The present invention and the earlier invention differs in that in the earlier invention two incident angle detectors are used while in the present invention only one incident angle detector is used to make the system to be compact. Furthermore, since the construction and operation of the incident angle detector is the same, the detailed explanation thereof is omitted.

There are provided a mouse, a joy stick, a light-pen and others. However, they are all mechanically connected with wires to the bodies of computers.

The computer input devices which use wires have disadvantages that a smooth surface is required in using a mouse, a wire become entangled and input operation must be carried out with hands being touched off the keyboard.

SUMMARY OF THE INVENTION

It is, therefore, an object of the invention to provide a wireless input system for a computer which eliminates the above-mentioned disadvantages.

It is another object of the invention to provide a wireless input system for a computer which makes improvements in the earlier invention.

BRIEF DESCRIPTION OF THE DRAWINGS

The present invention will be now described in detail with reference to the preferred embodiments illustrated in the accompanying drawings in which.

DESCRIPTION OF THE PREFERRED EMBODIMENTS

Figure 1:
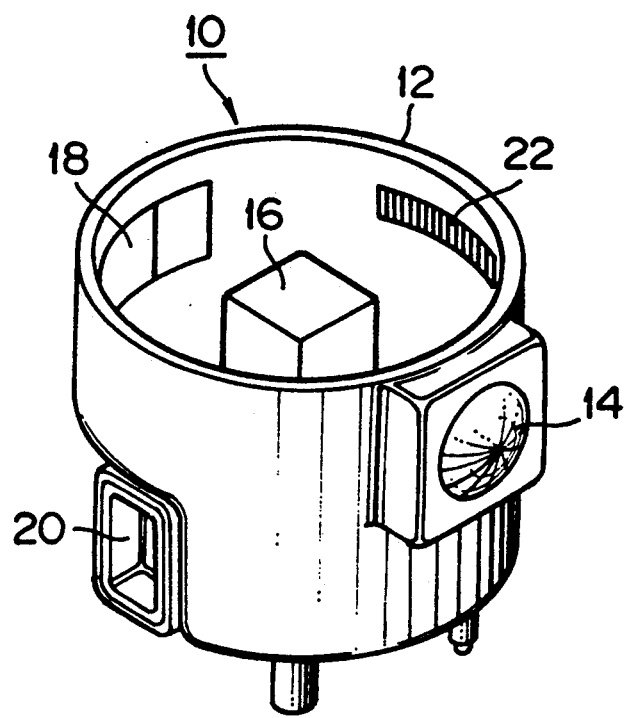
FIG. 1 is a perspective view showing main components of a wireless input system for a computer according to the present invention.
Figure 10:
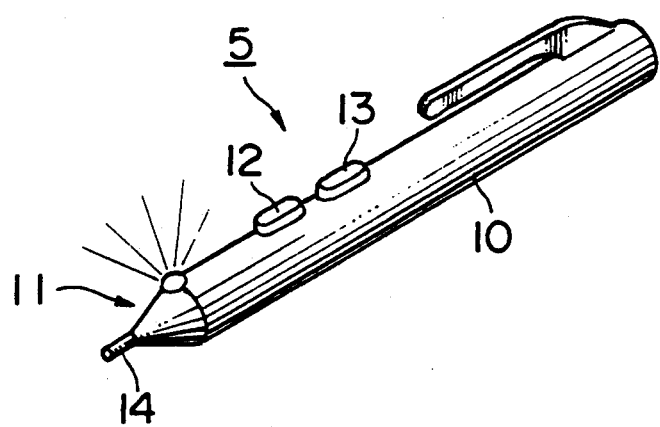
FIG. 10 is a perspective view showing a wireless pen-type input unit.

Referring now to FIG. 1, there is shown an incident angle detecting section and a focus detecting section of a wireless input system for a computer according to the present invention. A wireless input system for a computer 10 comprises a cylindrical frame 12 disposed in a body of a wireless input device, 5 as shown in FIG. 10. A movable lens 14 is mounted on the cylindrical frame 12 at its outer wall. Furthermore, a mechanism for moving a lens 14 will be described hereinafter with reference to FIGS. 2 and 3. A beam splitter 16 is disposed in the cylindrical frame 12. The beam splitter 16 splits a light which is emitted from a pen-type input unit having a source of light capable of emitting pulses and passes through the movable lens 14 into two lights one light impinging on a light receiving element (for example, two division photo-detector) 18 of an incident angle detecting section and the other light impinging on light detecting means 22 such as a light receiving element (for example, a CCD line sensor or two division photo-detector). Furthermore, the light receiving elements 18 and 22 are attached to the cylindrical frame 12 at its inner wall.

A linear motor coil 20 is attached to the cylindrical frame 12 at its rear lower portion. The linear motor coil 20 constitutes a linear motor together with a yoke and a magnet attached to the frame, not shown, of the device. The linear motor forms an incident angle detecting section together with the movable lens 14, the light receiving element 18 and a feedback circuit, not shown. The incident angle detecting section causes the cylindrical frame 12 to rotate so that the movable lens 14 is directed to the pen-type input unit.

Since the wireless input device body, the pen-type input unit, the linear motor and the incident angle detecting section are explained in detail in the above-mentioned earlier patent application, the detailed explanation thereof is omitted herein.

Figure 2:
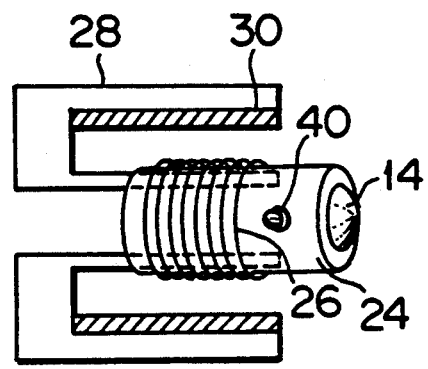
FIG. 2 is a diagrammatic perspective view showing one embodiment of a main component of a focus detecting section.
Figure 3:
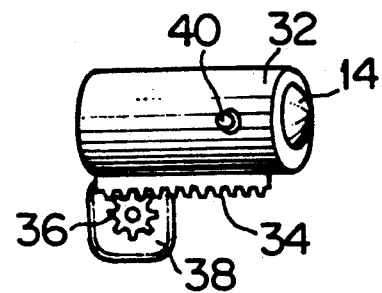
FIG. 3 is a diagrammatic perspective view showing another embodiment of a main component of a focus detecting section.

Referring now to FIGS. 2 and 3 diagrammatically showing two embodiments in which the light incident on the light receiving element 22 through the movable lens 14 and the beam splitter 16 can cause the movable lens 14 to move. In the embodiment of FIG. 2, the movable lens 14 is adapted to be moved by a linear motor. That is, the movable lens 14 is attached to a cylindrical support 24 at its end, a linear motor coil 26 is disposed on the rear outer wall of the cylindrical support 24, and a yoke 28 on which a magnet 30 is disposed is attached to the cylindrical frame 12 so that it is in operating relationship with the coil 26. Therefore, the coil 26, the yoke 28 and the magnet 30 constitutes a linear motor. The linear motor thus constituted is supplied through a feedback circuit, not shown, with an electric current based on the light incident on the light receiving element 22 to cause the movable lens 14 to move.

In the embodiment of FIG. 3, a rack and pinion mechanism causes the movable lens 14 to move. The movable lens 14 is supported on a cylindrical support 32, and a rack is attached to the cylindrical support 32 at its outer wall. The rack 34 is disposed so that it is engaged with a pinion 36 attached to the shaft of a motor 38 attached to the cylindrical frame 12. Therefore, in a similar manner to the control of the linear motor, the motor 38 is supplied through a feedback circuit, not shown, with an electric current based on the light incident on the light receiving element 22 to cause the movable lens 14 to move.

Figure 4:
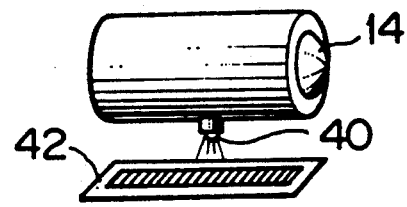
FIG. 4 is a diagrammatic perspective view showing a mechanism for detecting the position of a movable lens.
Figure 5:
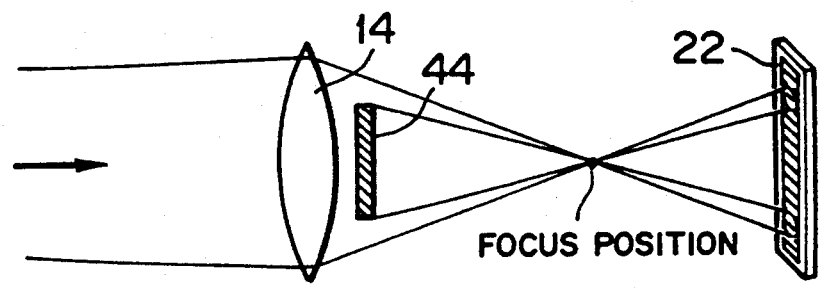
FIG. 5 is a side view showing one embodiment of a focusing mechanism.

Referring now to FIG. 4 showing a construction for detecting the position of the movable lens 14, a light emitting element 40 such as an LED is mounted on the outer wall of the cylindrical support 26/32 of FIG. 2 or FIG. 3, and a light receiving element 42 such as a CCD line sensor is disposed in the cylindrical frame so that it receives a light from the light emitting element 40. From the position of light which the light receiving element 42 senses, the position of the movable lens can be detected.

Furthermore, the detection of position of movable lens can be made by a PSD (position sensing device) or a linear encoder instead of the CCD line sensor. Furthermore, in the embodiment of FIG. 3, the quantity of rotation of the motor may be detected by a rotary encoder.

Figure 6A:
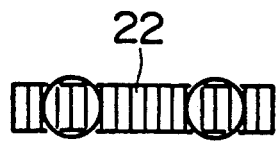
FIGS. 6a through 6c are front views showing light receiving status of a light receiving element of FIG. 5, respectively.
Figure 6B:
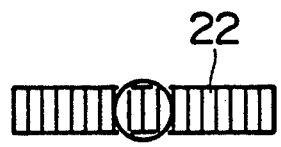
Figure 6C:
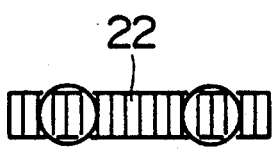

Referring now to FIGS. 5 and 6a through 6c, one embodiment of focusing construction will be explained. In the embodiment, a CCD line sensor is used as a light receiving element, a light intercepting plate 44 is disposed between the CCD line sensor and the movable lens 14. The FIGS. 6a through 6c show the status of light where the CCD line sensor is nearer than the focus position, the status of light where the CCD line sensor is on the focus position and the status of light where the CCD line sensor is more far away than the focus position, respectively. The movable lens 14 is controlled to move so as to take a position as shown in FIGS. 6b from other positions as shown in FIGS. 6a and 6c through the mechanism described with reference to FIGS. 2 and 3.

Figure 7A:
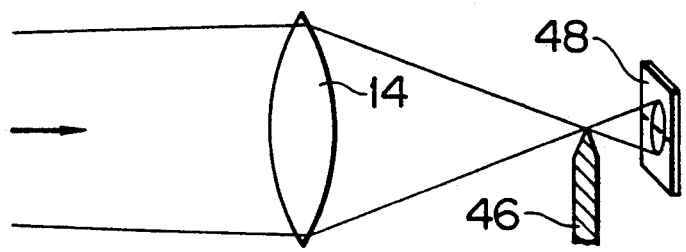
FIGS. 7a and 7b are side views showing another embodiments of a focusing mechanism, respectively.
Figure 7B:
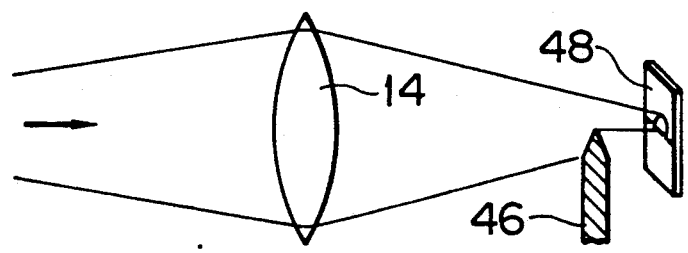
Figure 8A:
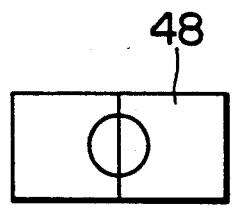
FIGS. 8a and 8b are front views showing light receiving status of a light receiving element used in the focusing mechanism of FIGS. 7a and 7b, respectively.
Figure 8B:
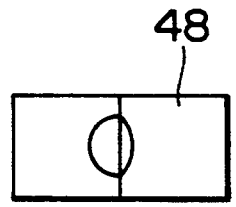

Referring now to FIGS. 7a, 7b, 8a and 8b showing another embodiment of focusing constructions, in these embodiments, two division photo-detector is used instead of the light receiving element and a knife edge 46 is used instead of the light intercepting plate. As shown in FIGS. 7a and 8a, when the knife edge is on the focus position, two light receiving portions of two division photo-detector receives equivalent quantities of light. However, as shown in FIGS. 7b and 8b, when the knife edge is nearer than the focus position, one light receiving portion receives more quantity of light than the other receives. The movable lens is controlled to move on the basis of difference in quantities of light.

Figure 9:
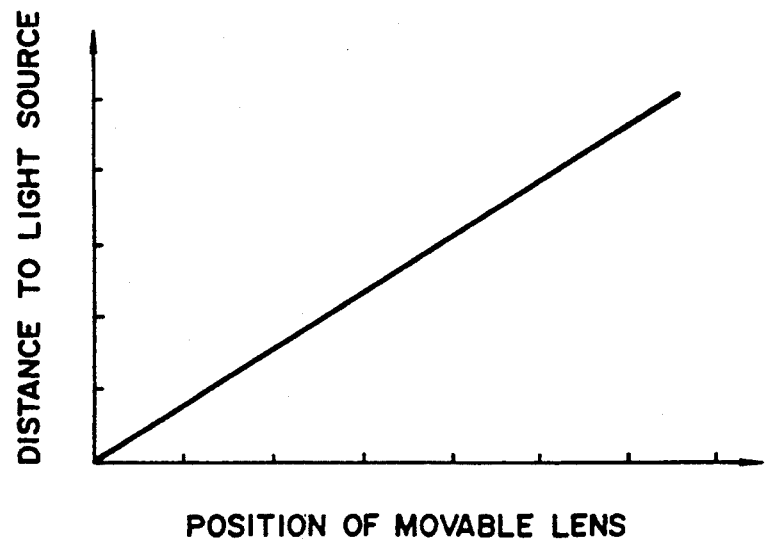
FIG. 9 is a graph showing a relationship between the position of a movable lens and a source of light.

Referring now to a graph of FIG. 9 showing a relationship between the position of the movable lens and a source of light, as clearly shown in FIG. 9. The position of the movable lens is linearly proportional to the distance from the movable lens to a source of light and thus the distance from the position of the movable lens to the source of light can be easily calculated.

Now, the explanation on the operation of the wireless input system for a computer will be briefly made. Firstly, the cylindrical frame 12 is caused to rotate by the incident angle detecting portion so that the movable lens 14 is directed to the source of light (or the pen-type input unit). Then, the cylindrical support 24/32 is moved by the focus detecting section so that the focus is positioned on the light receiving element or on any suitable position. Thereafter, the position of the cylindrical support, therefore, the movable lens is detected by the CCD line sensor 42 or the like. Finally, the distance between the movable lens and the source of light is calculated on the basis of the position thus obtained.

What we claim:

1. A wireless input device for a computer which is capable of detecting the position of a source of incident light, such as a movable, pen-type input unit that emits light pulses, comprising:

a substantially cylindrical frame which is rotatably supported;

a light source distance detecting section mounted on said cylindrical frame for detecting a distance of the incident light source from said input device, said light source distance detecting section comprising: (a) a lens movably mounted on said cylindrical frame for receiving the incident light from the light source; (b) focus detecting means for detecting when the incident light received through said lens becomes focused; (d) lens moving means coupled to said focus detecting means for controllably moving said lens to the focus position; and (d) focus position detecting means for detecting the focus position to which said movable lens is moved, wherein the detected focus position of said movable lens has a predetermined relationship in correspondence to the distance of the light source from said lens;

an incident angle detecting section mounted on said cylindrical frame for detecting an angle at which the incident light is received by said lens, said incident angle detecting section including: (a) a two-division photo-detector mounted on said cylindrical frame at a position for receiving incident light passing through said movable lens, said two-division photo-detector having two light detecting portions for comparatively measuring two quantities of the incident light received through said movable lens; (b) frame rotating means for rotating the cylindrical frame to an angle position corresponding to the angle of the incident light at which a difference between the two measured quantities of the incident light is eliminated; and (c) angle position detecting means for detecting the angle position to which said frame is rotated corresponding to the angle of the incident light; and a calculating section for calculating the position of the source of incident light based upon the focus position of the incident light detected by said focus position detecting means and the angle position of the incident light detected by said incident angle detecting section.

2. A wireless input device for a computer according to claim 1, wherein said focus detecting means includes a CCD line sensor for detecting the incident light received through said movable lens, and a light intercepting plate disposed between said CCD line sensor and said lens, said lens being movable relative to said light intercepting plate such that the light detected by said CCD line sensor becomes focused when said lens is moved to the focus position.

3. A wireless input device for a computer according to claim 1, wherein said focus detecting means includes a two-division photo-detector for detecting the incident light received through said movable lens, and a knife edge disposed between said two-division photo-detector and said lens, said two-division photo-detector comparatively measuring two quantities of the incident light, and said lens being movable relative to said knife edge such that a difference between the two quantities of the incident light detected by said two-division photo-detector becomes eliminated when said lens is moved to the focus position.

4. A wireless input device for a computer according to claim 1, wherein said frame rotating means comprises a linear motor coil attached to said cylindrical frame and coupled to an output of said two-division photo-detector comparatively measuring the two quantities of the incident light.

5. A wireless input device for a computer according to claim 1, wherein said lens moving means comprises a cylindrical support to which said lens is attached at one end thereof, a linear motor coil attached to said cylindrical support, a yoke on which a magnet is disposed attached to said cylindrical frame and disposed so that it is in operating relationship with said coil, and said coil being coupled to an output of said focus detecting means for detecting when the incident light received through said movable lens becomes focused.

6. A wireless input device for a computer according to claim 1, wherein said lens moving means comprises a cylindrical support to which said lens is attached at one end thereof, a linear rack attached to said cylindrical support, a pinion gear output of a motor attached to said cylindrical frame and disposed in mesh with said rack, and the motor being coupled to an output of said focus detecting means for detecting when the incident light received through said lens becomes focused.

7. A wireless input device for a computer according to claim 1, wherein said focus position detecting means comprises a light emitting element mounted to a support on which said movable lens is mounted, and a light-receiving, position-sensing element attached to said frame and disposed to detect the position of the light emitting element when said movable lens is moved to the focus position at which the incident light becomes focused.

8. A wireless input device for a computer according to claim 7, wherein said light emitting element of said focus position detecting means is an LED, and the light-receiving, position-sensing element is a CCD line sensor.

9. A wireless input device for a computer according to claim 1, further comprising a light dividing means mounted on said frame for dividing the light received through said movable lens into one portion which impinges on said focus detecting means of said light source distance detecting section and another portion which impinges on said two-division photo-detector of said incident angle detecting section.

10. A wireless input device for a computer according to claim 9, wherein said light dividing means comprises a beam splitter.

11. A wireless input device for a computer according to claim 1, wherein the detected focus position of said movable lens is in linear proportion to the distance of the light source from said lens.

12. A wireless input device for a computer which is capable of detecting the position of a source of incident light, such as a movable, pen-type input unit that emits light pulses, comprising:
    a light source distance detecting section mounted with said wireless input device for detecting a distance of the incident light source from said input device, said light source distance detecting section comprising: (a) a lens movably mounted on said input device for receiving the incident light from the light source; (b) focus detecting means for detecting when the incident light received through said lens becomes focused; (d) lens moving means coupled to said focus detecting means for controllably moving said lens to the focus position; and (d) focus position detecting means for detecting the focus position to which said movable lens is moved, wherein the detected focus position of said movable lens has a predetermined relationship in correspondence to the distance of the light source from said input device;
    an incident angle detecting section mounted with said wireless input device for detecting an angle at which the incident light is received by said lens; and
    a calculating section for calculating the position of the source of incident light based upon the focus position of said movable lens detected by said focus position detecting means and the angle position of the incident light detected by said incident angle detecting section,
    wherein said focus detecting means includes a CCD line sensor for detecting the incident light received through said movable lens, and a light intercepting plate disposed between said CCD line sensor and said lens, said lens being movable relative to said light intercepting plate such that the light detected by said CCD line sensor becomes focused when said lens is moved to the focus position.

13. A wireless input device for a computer which is capable of detecting the position of a source of incident light, such as a movable, pen-type input unit that emits light pulses, comprising:
    a light source distance detecting section mounted with said wireless input device for detecting a distance of the incident light source from said input device, said light source distance detecting section comprising: (a) a lens movably mounted on said input device for receiving the incident light from the light source; (b) focus detecting means for detecting when the incident light received through said lens becomes focused; (d) lens moving means coupled to said focus detecting means for controllably moving said lens to the focus position; and (d) focus position detecting means for detecting the focus position to which said movable lens is moved, wherein the detected focus position of said movable lens has a predetermined relationship in correspondence to the distance of the light source from said input device;
    an incident angle detecting section mounted with said wireless input device for detecting an angle at which the incident light is received by said lens; and
    a calculating section for calculating the position of the source of incident light based upon the focus position of said movable lens detected by said focus position detecting means and the angle position of the incident light detected by said incident angle detecting section,
    wherein said focusing means includes a two-division photo-detector for detecting the incident light received through said movable lens, and a knife edge disposed between said two-division photo-detector and said lens, said two-division photo-detector comparatively measuring two quantities of the incident light, and said lens being movable relative to said knife edge such that a difference between the two quantities of the incident light detected by said two-division photo-detector becomes eliminated when said lens is moved to the focus position.

* * * * *